United States Patent
Ako et al.

(10) Patent No.: US 7,619,013 B2
(45) Date of Patent: Nov. 17, 2009

(54) RECLAIMED RESIN COMPOSITION PRODUCED FROM PULVERIZED WASTE PLASTIC MATERIAL CONTAINING SOLID FOREIGN MATERIALS

(75) Inventors: Tatsushi Ako, Osaka (JP); Tomohiko Akagawa, Osaka (JP); Yasuo Kita, Osaka (JP); Kenji Nozaki, Osaka (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 298 days.

(21) Appl. No.: 10/576,199

(22) PCT Filed: Oct. 18, 2004

(86) PCT No.: PCT/JP2004/015381

§ 371 (c)(1),
(2), (4) Date: Apr. 17, 2006

(87) PCT Pub. No.: WO2005/037927

PCT Pub. Date: Apr. 28, 2005

(65) Prior Publication Data

US 2007/0054970 A1    Mar. 8, 2007

(30) Foreign Application Priority Data

Oct. 17, 2003  (JP)  ............................. 2003-358549
Mar. 31, 2004  (JP)  ............................. 2004-106636

(51) Int. Cl.
*C08J 11/04*      (2006.01)

(52) U.S. Cl. .................. 521/40; 521/40.5; 521/41; 521/43.5; 521/44; 521/48; 521/48.5; 528/480; 528/490; 428/34; 428/221

(58) Field of Classification Search ............... 521/48.5, 521/40, 40.5, 41, 43.5, 44, 48; 528/480, 528/490; 428/34, 221
See application file for complete search history.

(56) References Cited

U.S. PATENT DOCUMENTS

H1120 H * 12/1992 Casey et al. ................ 521/40.5

2004/0130052 A1  7/2004  Suzuki et al.
2008/0132590 A1  6/2008  Suzuki et al.

FOREIGN PATENT DOCUMENTS

| JP | 05-092430   | 4/1993  |
|----|-------------|---------|
| JP | 05-169479   | 7/1993  |
| JP | 06-192498   | 7/1994  |
| JP | 2000-319496 | 11/2000 |
| JP | 2002-292628 | 10/2002 |

OTHER PUBLICATIONS

Drobny, Jiri George Handbook of Thermoplastic Elastomers. (pp. 13, 14 and 19). William Andrew Publishing/Plastics Design Library. Online version available at: http://knovel.com/web/portal/browse/display?_EXT_KNOVEL_DISPLAY_bookid=2043&VerticalID=0.*
International Search Report for PCT/JP2004/015381 dated Mar. 8, 2005.

* cited by examiner

*Primary Examiner*—Ling-Siu Choi
*Assistant Examiner*—Frances Tischler
(74) *Attorney, Agent, or Firm*—Nixon Peabody LLP; Jeffrey L. Costellia

(57) ABSTRACT

[Problems] To produce a resin composition from a waste plastic material composed of a major portion of a thermoplastic resin and a small amount of incompatible solid foreign material.

[Means for solving problems] A reclaimed resin composition which is produced by mixing a pulverized waste plastic material containing a major portion of a thermoplastic resin and a small amount of a non-thermoplastic solid foreign material with a light-shielding component and a light-shielding filler to give a mixture and melting the mixture under heating, and a sheet made from which shows a relationship between a lightness and a light transmittance satisfying the following condition:

$$(A \times B) \leq 4000$$

wherein A means a lightness of a sheet of 3 mm thick having been made of the reclaimed resin composition, and B means a total light transmittance (%) of a sheet of 50 μm thick having been made of the resin composition.

6 Claims, No Drawings

RECLAIMED RESIN COMPOSITION PRODUCED FROM PULVERIZED WASTE PLASTIC MATERIAL CONTAINING SOLID FOREIGN MATERIALS

FIELD OF INVENTION

The present invention relates to a colored or white reclaimed resin composition which is produced from pulverized thermoplastic waste plastic material containing a small amount of incompatible solid foreign materials such as pieces of plant, pieces of metal, and metal oxide.

PRIOR ART

Recently, it is desired to reuse waste synthetic resin products (waste plastic materials) such as discarded automobile parts, parts of household electric appliances, various cases, office apparatuses, and stationeries for production of new synthetic resin products, so as to obviate environmental disruption. Accordingly, a number of industrial companies have studied methods for efficiently reclaiming these synthetic resin products. Otherwise, the waste plastic materials wan be those which have become unacceptable due to troubles taking place in the production, transfer, and storage of synthetic resin products and excessive or waste plastic materials produced in the production of synthetic resin articles, in addition to the discarded synthetic resin products.

Since most of synthetic resin products comprise a thermoplastic resin, most known method for reclaiming synthetic resin products comprises the steps of pulverizing the waste plastic materials (discarded synthetic resin product) to prepare a pulverized product (pulverized plastic material), washing the pulverized product, heating the pulverized product to give a molten product, and converting the molten product into solid particles.

JP-A-2000-281846 describes a method for reusing a coated resin product which comprises blending waste coated plastic products of modified polypropylene resin containing 10 to 40 wt. % of ethylene-propylene copolymeric elastomer with high density polyethylene resin or a combination of high density polyethlene resin and low density polyethylene resin.

JP-A-2000-327896 describes a colored master batch resin composition comprising (A) 90 to 30 wt. % of a recycled aromatic polycarbonate resin containing 0.01 to 0.1 wt. % of foreign material and (B) 10 to 70 wt. % of an inorganic pigment. The recycled aromatic polycarbonate is recovered from discarded optical information recording media having a substrate of aromatic polycarbonate resin.

DISCLOSURE OF INVENTION

Problems to be Solved

To the waste plastic materials are generally attached solid foreign materials such as pieces of plant, pieces of metal, pieces of cured resin, and sand, because they are collected from various products or in various production lines, as described hereinbefore. Since most of these solid materials are non-thermoplastic materials, the solid foreign materials are as such migrated and dispersed in the molten thermoplastic resin material produced from the waste plastic materials. Therefore, the solid foreign materials are also dispersed in the pulverized waste plastic materials. Accordingly, if a new synthetic resin product (article) is produced from these pulverized waste plastic materials, the resulting resin product necessarily contains solid foreign materials which are present on the surface of the resin product. The resin product having the surface showing dispersed solid foreign materials is hardly acceptable due to inferior appearance. Accordingly, the pulverized waste plastic materials have been used only for producing resin articles of which appearance is not noticed.

Most of the solid foreign materials can be removed from the waste plastic materials by washing or filtering. However, incorporation of these steps into the recycling lines is not desired in industry. Moreover, it is very difficult to remove almost all of the solid foreign materials from the waste plastic materials.

Accordingly, it is an object of the invention to provide a resin composition employable for manufacture of synthetic resin products having good appearance from waste plastic materials comprising a thermoplastic resin and a small amount of incompatible solid foreign materials such as pieces of plant, pieces of metal and metal oxide.

MEANS FOR SOLVING THE PROBLEMS

The present inventors have discovered that a reclaimed resin composition produced by mixing pulverized waste plastic materials containing a snail amount of solid foreign materials with a light-shielding-component such as a light-shielding pigment or a light-shielding filler and melding the resulting mixture under heating can be utilized to manufacture synthetic resin articles having a good appearance and reached the present invention.

The present invention resides in a reclaimed resin composition which is produced by mixing a pulverized waste plastic material containing a major portion of a thermoplastic resin and 0.001 to 2 weight % of a non-thermoplastic solid foreign material with a light-shielding component selected from the group consisting of a light-shielding pigment and a light-shielding filler to give a mixture and melting the mixture under heating, and a sheet made from which shows a relationship between a lightness and a light transmittance satisfying the following condition:

$$(A \times B) \leq 4000$$

wherein A means a lightness of a sheet of 3 mm thick having been made of the resin composition, and B means a total light transmittance (%) of a sheet of 50 μm thick having been made of the resin composition.

The invention further resides in a process for producing a resin composition satisfying the below-mentioned condition 2 which comprises the steps of mixing a pulverized waste plastic material containing a major portion of a thermoplastic resin and 0.001 to 2 weight % of a non-thermoplastic solid foreign material and satisfying the below-mentioned condition 1 with a light-shielding component selected from the group consisting of a light-shielding pigment and a light-shielding filler to give a mixture and melting the mixture under heating, condition 1: a sheet made from the pulverized waste plastic material shows a relationship between a lightness and a light transmittance satisfying the following condition:

$$(C \times D) \leq 4000$$

wherein C means a lightness of a sheet of 3 mm thick having been made of the pulverized waste plastic material, and D means a total light transmittance (%) of a sheet of 50 μm thick having been made of the pulverized waste plastic material, condition 2: a sheet made from the resin composition shows a relationship between a lightness and a light transmittance satisfying the following condition:

$$(A \times B) \leq 4000$$

wherein A means a lightness of a sheet of 3 mm thick having been made of the resin composition, and B means a total light transmittance (%) of a sheet of 50 µm thick having been made of the resin composition.

The preferred embodiments of the invention are described below.

(1) A sheet made from the resin composition of the invention shows a relationship between a lightness and a light transmittance satisfying the following condition:

$$1300 \leq (A \times B) \leq 4000$$

wherein each of A and B has the same meaning as defined hereinbefore.

(2) A which weans a lightness of the sheet made from the above-mentioned resin composition is in the range of 30 to 90, more preferably in the range of 35 to 90, most preferably 38 to 88.

(3) B which means a total light transmittance of the sheet made of the above-mentioned resin composition is in the range of 15 to 70%, more preferably in the range of 18 to 65%, further preferably in the range of 20 to 65%, most preferably in the range of 22 to 60%.

(4) The light-shielding component comprises titanium dioxide or titanium yellow.

(5) The light-shielding component comprises titanium dioxide and a colored pigment.

(6) The light-shielding component comprises titanium dioxide and carbon black.

(7) A dispersant is added to the mixture before the mixture is melted under heating.

(8) A thermoplastic resin and/or an elastomer is added to the mixture before the mixture is melted under heating.

(9) The pulverized waste plastic material contains a thermoplastic material selected from the group consisting of polyolefin, polyester, polystyrene, ABS resin, and polyamide.

(10) The resin composition is white or colored.

(11) A resin article which is manufactured by melting the resin composition of the invention under heating and molding the melted resin composition.

EFFECT OF THE INVENTION

The reclaimed resin composition of the invention is favorably employable for manufacturing articles of synthetic resin having good appearance because an appropriate amount of a light-shielding material is dispersed in the starting waste plastic material.

PREFERRED EMBODIMENTS OF THE INVENTION

Examples of the pulverized waste plastic materials to be reclaimed in the invention include pulverized resin materials recovered from excessive portions of resinous material which have been produced in the molding step and processing step, defective resinous articles having colored spots or dusts which have been produced or migrated in the molding step, processing step, and transferring step, discarded automobile parts such as automobile interior and exterior parts (e.g., instrument panels, bumpers and resinous moleskins), discarded household electric appliances, industrial waste parts, discarded construction materials. Preferred pulverized resin materials are colorless, pale white, pale black, pale colored, white, black, or colored materials which are collected from automobile parts, household electric appliances, industrially produced wastes, and construction materials.

The pulverized waste plastic materials to be claimed in the invention are thermoplastic materials containing 0.001 to 2 wt. %, preferably 0.01 to 1 wt. %, more preferably 0.01 to 0.5 wt. %, most preferably 0.01 to 0.2 wt. % of incompatible solid foreign materials.

Examples of the solid foreign materials contained in the waste plastic materials include inorganic sand materials, pieces of plant, pieces of metal, fibrous dusts, resin decomposition products, metal oxides, and cured resins which are hardly melted under heating conditions in the resin reclaiming process. Most of the solid foreign materials preferably have a length of 1.5 mm or less and pass a 20 mesh screen.

The pulverized waste plastic materials have a diameter of, generally 30 mm or less, preferably 1 to 30 mm, more preferably 1 to 25 mm, further preferably 1 to 20 mm, most preferably 1 to 12 mm. Pellets produced from waste plastic materials by extrusion and pelletization also can be employed in the invention.

The pulverized waste plastic materials to be used in the invention as the starting materials preferably are those satisfying the below-mentioned condition 1:

condition 1: a sheet made from the pulverized waste plastic material shows a relationship between a lightness and a light transmittance satisfying the following condition:

$$(C \times D) > 4000$$

wherein C means a lightness of a sheet of 3 mm thick having been made of the pulverized waste plastic material, and D means a total light transmittance (%) of a sheet of 50 µm thick having been made of the pulverized waste plastic material.

The light transmittance of the sheet produced from the pulverized waste plastic material to be reclaimed in the invention preferably 55% or higher, more preferably 60% or higher, further preferably 65% or higher, most preferably 70% or higher.

The light-shielding component to be added to the pulverized waste plastic material is a light-shielding pigment and/or a light-shielding filler. The light-shielding pigment is preferred. Preferred light-shielding pigments comprise at least one of titanium dioxide (titanium white), carbon black, and titanium yellow.

The light-shielding pigment can be a white pigment, a colored pigment, or a black pigment. These pigments can be used singly or in combination. The use of at least one of carbon black and titanium dioxide as the light-shielding pigment is preferred to produce a colored resin material having controlled color.

The white pigment can be titanium dioxide, white lead, and zinc oxide. Most preferred is titanium dioxide.

Any of known titanium dioxide pigments can be employed with no specific limitations. For instance, titanium dioxide prepared by the chlorine method or sulfuric acid method can be employed. Preferred is titanium dioxide prepared by the chlorine method. There are no specific limitations with respect to the forms of the particles. Titanium dioxide of tetragonal type, rutile type, or anatase type can be employed. Preferred are titanium dioxide of the tetragonal type or rutile type. There is no limitation with respect to mean size of the particles. It is preferred that the mean particle size is within 0.01 to 0.5 µm, more preferably 0.05 to 0.5 µm, more preferably 0.1 to 0.4 µm, and particularly preferably 0.2 to 0.3 µm, because these particles are satisfactory in dispersability and handling. There is no limitation with respect to DOP absorption of the titanium dioxide. It is preferred that the DOP absorption is within 5 to 40 cc/100 g, more preferably 8 to 30 cc/100 g, more preferably 10 to 20 cc/100 g, and rest preferably 12 to 18 cc/100 g.

Any of known colored pigments can be employed in the invention. Examples include inorganic pigments such as oxides, hydroxides, sulfides, chromates, carbonates, sulfates and silicates of metal; and organic pigments such as azo compounds, diphenylmethane compounds, triphenylmethane compounds, phthalocyanine compounds, nitro compounds, nitroso compounds, anthraquinone compound, quinacridone red corresponds, benzidine compounds, fused polycyclic compounds. Also employable are colored fibers and metal particles. There is no specific limitation with respect to hue of the colored pigment. Any of yellow pigments, blue pigments, red pigments, and green pigments can be employed. The pigments can be employed in combination of two or more.

Examples of the colored pigments employable in the invention include inorganic pigments such as iron oxide red, calcium red, cadmium yellow, ultramarine blue, cobalt blue, titanium yellow, red lead, yellow lead, prussian blue, zinc sulfide, chromium yellow, barium yellow, cobalt blue, and cobalt green; organic pigments such as quinacridone red, polyazo yellow, anthraquinone red, anthraquinone yellow, polyazo red, azo lake yellow, perylene, phthalocyanine blue, phthalocyanine green, isoindolinone yellow, watchung red, permanent red, para red, toluidine maroon, benzidine yellow, fast sky blue, and brilliant carmine 6B; colored fibers, and glossy metal particles. The pigments can be employed in combination of two or more.

There is no specific limitation with respect to mean size of the titanium yellow. It is preferred that the mean size is within 0.1 to 1.5 μm, more preferably 0.5 to 1.3 μm, more preferably 0.7 to 1.1 μm, and most preferably 0.8 to 1 μm because they are satisfactory in dispersability and handling. There is no specific limitation with respect to DOP absorption of the titanium yellow. It is preferred that the DOP absorption is within 15 to 40 cc/100 g, more preferably 20 to 35 Cc/100 g, and most preferably 20 to 30 cc/100 g. There is no specific limitation with respect to pH of the titanium yellow. Preferred is pH 6 to 10, and pH 7 to 9 is most preferred.

There is no specific limitation with respect to mean size of the ultramarine blue. It is preferred that the mean size is within 0.1 to 5 μm, more preferably 0.5 to 4 μm, more preferably 0.8 to 3.5 μm, and most preferably 1-3 μm, because they are satisfactory in dispersability and handling. There is no specific limitation with respect to DOP absorption of the ultramarine blue. It is preferred that the DOP absorption is within 20 to 50 cc/100 g, more preferably 25 to 40 cc/100 g, and most preferably 30 to 35 cc/100 g. There is no specific limitation with respect to pH of the ultramarine blue. Preferred is pH 5 to 11. pH 5.5 to 11 is more prefer, and pH 7 to 11 is most preferred.

As for the phthalocyanine blue, any of phthalocyanine blue pigments can be employed. For instance, those produced by the Waller process or the phthalonitrile process can be employed. There is no specific limitation with respect to form of the phthalocyanine blue. Phthalocyanine blue pigments of α-type and β-type can be employed. There is no specific limitation with respect to mean size of the phthalocyanine blue. It is preferred that the mean size is within 0.01 to 2 μm, more preferably 0.05 to 1.5 μm, more preferably 0.1 to 0.4 μm, and most preferably 0.1 to 1 μm.

As for the phthalocyanine green, any of known phthalocyanine green pigments can be employed. For instance, those produced by the Waller process or the phthalonitrile process can be employed. There is no specific limitation with respect to form of the phthalocyanine green. Phthalocyanine green pigments of α-type and β-type can be employed. There is no specific limitation with respect to mean size of the phthalocyanine green. It is preferred that the mean size is within 0.01 to 2, more preferably 0.05 to 1.5 μm, more preferably 0.1 to 0.4 μm, and most preferably 0.1 to 1 μm. There is no specific limitation with respect to pH of the phthalocyanine green. Preferred is pH 4 to 9, and pH 4 to 8 is more preferred.

As for the iron oxide red, any of known iron oxide red pigments can be employed. There is no specific limitation with respect to form of the iron oxide red. Iron oxide red pigments of isometric system can be employed. There is no specific limitation with respect to mean size of the iron oxide red. It is preferred that the mean size is within 0.01 to 1 μm, more preferably 0.05 to 0.5 μm, more preferably 0.08 to 0.4 μm, most preferably 0.1 to 0.3 μm. There is no specific limitation with respect to DOP absorption of the iron oxide red. It is preferred that the DOP absorption is within 10 to 50 cc/100 g, more preferably 12 to 40 cc/100 g, and most preferably 15 to 30 cc/100 g. There is no specific limitation with respect to pH of the iron oxide red. Preferred is pH 4 to 8, and pH 5 to 7 is more preferred.

As for the quinacridone red, any of known quinacridone red pigments can be employed. There is no specific limitation with respect to form of the quinacridone red. Quinacridone red pigments of α-type, β-type and γ-types can be employed. There is no specific limitation with respect to mean size of the quinacridone red. It is preferred that the mean size is within 0.01 to 2 μm, more preferably 0.05-1.5 μm, and most preferably 0.1 to 1 μm.

As for the anthraquinone red, any of known anthraquinone red pigments can be employed. There is no specific limitation with respect to form of the anthraquinone red. There is no specific limitation with respect to mean size of the anthraquinone red. It is preferred that the bean size is within 0.01 to 2/an, more preferably 0.05-1.5 μm, and most preferably 0.1 to 1 μm. There is no specific limitation with respect to pH of the anthraquinone red. Preferred is pH 4 to 9.

Examples of the black pigments include carbon black and iron black. The black pigment can impart a high light-shielding property to the reclaimed resin articles. The black pigments can be employed in combination of two or more.

As for the carbon black, any of known carbon black pigments can be employed without no specific limitations. For instance, carbon black, acetylene black, lamp black, channel black, or ketchen black produced by the furnace process or channel process can be employed. The carbon black can be subjected to oxidation processing. Preferred is a furnace black produced by the furnace process, because it has good uniform appearance, good dispersability, and blackness and increased gloss of the resulting molded article. There is no specific limitation with respect to mean size of the carbon black. It is preferred that the mean size is within 0.001 to 0.3 μm, more preferably 0.005 to 0.2 μm, more preferably 0.01 to 0.1 μm, and most preferably 0.01 to 0.03 μm, because a carbon black of such mean size is excellent in dispersability and handling, and moreover ides high blackness and high glossiness.

The iron black can be a black iron oxide produced by the firing method. There is no specific limitation with respect to the form of the iron black. Iron black having a polyhedral form such as an octahedral form or a globular form can be used. Preferred is an octahedral iron black. There is no specific limitation with respect to mean size of the iron black. It is preferred that the mean size is within 0.05 to 0.4 µm, more preferably 0.15 to 0.35 µm, and most preferably 0.2 to 0.35 µm. There is no specific limitation with respect to DOP adsorption of the iron black. It is preferred that the DOP absorption is within 10 to 80 cc/100 g, more preferably 15 to 50 cc/100 g, more preferably 20 to 40 cc/100 g, and most preferably 25 to 30 cc/100 g. There is no specific limitation with respect to pH of the iron black. Preferred is pH 9 to 11, and pH 9 to 10 is more preferred.

The white pigment, black pigment, and/or colored pigment can be added directly, or in the form of a master batch. Technology of master batch utilizing a pigment a resin component is already known.

A non-light-shielding filler can be optionally added to the pulverized waste resin materials, and the addition of the filler is preferred for improving physical properties of the resulting reclaimed resin articles. The fillers can be employed in combination of two or more.

The light-shielding fillers are those other than the light-shielding pigments. The light-shielding filler can be an organic filler or an inorganic filler. Examples of the inorganic fillers include talc, clay, mica, silica, diatomaceous earth, magnesium aluminate, montmorillonite, bentonite, dolomite, dosonite, silicates, carbon fibers, glasses (including glass fibers), barium ferrite, beryllium oxide, aluminum hydroxide, magnesium hydroxide, basic magnesium carbonate, calcium carbonate, magnesium carbonate, magnesium sulfate, calcium sulfate, barium sulfate, ammonium sulfate, calcium sulfite, calcium silicate, molybdenum sulfite, zinc borate, barium methaborate, calcium borate, sodium borate, metals such as zinc, copper, iron, lead, aluminum, nickel, chromium, titanium, manganese, tin, platinum, tungsten, gold, magnesium, cobalt, and strontium, oxides of the metals, stainless steel, solder, metal alloy such as brass, powders of metallic ceramics such as silicon carbide, silicon nitride, zirconia, aluminum nitride, titanium carbide, whiskers, and fibers.

As the filler, an inorganic filler is preferred, and talc is most preferred.

In the method of reclaiming the pulverized resin material, additives and dispersants such as lubricants, anti-static agents, surfactants, nucleating agents, ultra-violet ray absorbers, oxidation inhibitors, flame retardants can be employed.

Examples of the dispersants include higher fatty acids, higher fatty acidamide, metal soaps, glycerol esters, hydrotalcite, polyethylene wax, and polypropylene wax.

Examples of the additives include oxidation inhibitors of phenol type, phosphorus type, and sulfur type, benzophenone, benzotriazole, ultraviolet ray absorbers such as HALS, and flame retardants of phosphorus type and halogen types.

As described before, a thermoplastic resin and/or an elastomer can be employed in the reclaiming process according to the invention. The thermoplastic resin and elastomer to be employed preferably is the same as or an equivalent to those contained in the resin product.

Accordingly, examples of the thermoplastic resin materials employable in the method of reclaiming the pulverized resin product are olefinic resins (e.g., high density polyethylene, low density polyethylene, crystalline polypropylene), polycarbonate resins, polyurethane resins, styrene resins, ABS resins (acrylonitrile-butadiene-styrene resins), polyester resins such as polybutylene terephthalate and polyethylene terephthalate, polyphenyl ether resins such as modified polyphenylene ether and polyphenylene sulfide, polyacryl resins such as poly(methyl methacrylate), polyamides such as 6-nylon, 66-nylon, 12-nylon, and 6,12-nylon, and polysulfones.

The elastomer can be a thermoplastic low-crystalline elastomer showing no clear yield point or a thermoplastic amorphous elastomer or rubber that shows neither clear melting point nor clear yield point and has rubber-like elasticity at room temperature. Examples of the thermoplastic elastomers include styrenic elastomer, olefinic elastomer, polyester elastomer, polyamide elastomer, and polyurethane elastomer. The elastomers can be used singly or in combination.

Examples of the styrenic elastomers include butadiene-styrene copolymer (which can be any of random copolymer, block copolymer, and graft copolymer) and its hydrogenated product, styrene-butadiene-styrene copolymer (SBS, etc.), hydrogenated styrene-butadiene-styrene (SEBS, etc.), isoprene-styrene copolymer (which can be any of random copolymer, block copolymer, and graft copolymer) and its hydrogenated product, hydrogenated-styrene-isoprene copolymer (SEPS, etc.), hydrogenated styrene-vinylisoprene copolymer (V-SEPS, etc.), styrene-isoprene-styrene copolymer (SIS, etc.), hydrogenated styrene-isoprene-styrene copolymer (SEPS, etc.), and hydrogenated styrene-butylene-olefin crystalline block copolymer (SEBC, etc.).

Examples of the polyolefin elastomers include amorphous or low-crystalline polyolefin, α-olefin copolymer, a mixture of polyolefin and olefinic rubber, natural rubber, isoprene rubber, butadiene rubber, butyl rubber, a copolymer elastomers of ethylene- and α-olefin having 3 to 12 carbon atoms or polypropylene elastomers of propylene and α-olefin having 2 to 13 (exclusive of 3) carbon atoms such as ethylene-propylene elastomer, ethylene-propylene-diene terpolymer elastomer, ethylene-1-butene-elastomer (EBM, EBS, etc.), ethylene-hexene elastomer, ethylene-octene elastomer, propylene-1-butene elastomer. Further examples of the polyolefin elastomers include hydrogenated acrylonitrile rubber, acrylonitrile-butadiene rubber, epichlorohydrin rubber, acryl rubber, and chloroprene rubber. Polyolefin elastomers such as copolymer elastomers of ethylene and α-olefin having 3 to 12 carbon atoms and copolymer elastomers of propylene and α-olefin having 2 to 12 (exclusive of 3) carbon atoms are preferred.

Examples of the polyester elastomers include-polyester-polyether copolymers, and polyester-polyester copolymers.

Examples of the polyamide elastomers include polyamide-polyester copolymers and polyamide-polyether copolymers. The elastomers can be used in combination.

The resin composition (reclaimed resin composition) preferably is a white or colored (except black) resin composition in which L* is 30.00 or less, a* is −1.00 to 0.40, and b* is −1.50 to 0.50.

The reclaimed resin composition of the invention can be produced by the following process:

(1) adding a presumably appropriate amount of a light-shielding component such as pigment or filler, and optionally a thermoplastic resin and an elastomer to a pulverized waste plastic material containing solid foreign materials to obtain a mixture;

(2) melting and kneading the mixture and preparing test sheets (for measuring lightness and light transmittance) directly from the mixture or via a granular product;

(3) measuring the lightness and light transmittance of the test sheets and examining the mixture with reference to the aforementioned condition, that is, if the resulting value (lightness×light transmittance (%)) is higher than 4,000, the step (1) is again performed, and if the resulting value is 4000 or less, the mixture is accepted as the reclaimed resin composition of the invention.

In the above-mentioned manner, a reclaimed resin which can be molded to produce a resin product having the desired color conditions, appearance, and characteristics is produced.

In the step (1) of the above-mentioned process for producing the reclaimed resin composition of the invention, the pulverized waste plastic material, a presumably appropriate amount of the light-shielding component such as pigment and filler, and optional components such as a thermoplastic resin and elastomer can be mixed in optional order.

Further, the step (1) for the production of the reclaimed resin of the invention wan be carried out in the following manner:

(i) the pulverized waste plastic material and the light-shielding material are first melted and kneaded, and optionally the thermoplastic resin and elastomer are added;

(ii) the pulverized waste plastic material, thermoplastic resin and elastomer are first melted and kneaded, and then the light-shielding component is added;

(iii) the light-shielding component, thermoplastic resin and elastomer are first melted and kneaded, and then the pulverized waste plastic material is added.

In other words, the addition and melting of the materials can be performed in optional orders.

There are no specific limitations with respect to the procedures and apparatuses for mixing the pulverized resin material and additives. Mixers and/or kneaders such as known single worm extruders (or kneaders), dual worm extruders (or kneader), tandem kneading apparatuses comprising a dual worm extruder and a single worm extruder (or kneader) combined in series, calenders, banbury mixers, kneading rolls, brabender plastgraphs, or kneaders can be employed.

The reclaimed resin composition of the invention can be processed by know molding procedures such as extrusion molding, sheet formation molding, injection molding, injection-compression molding, gas injection molding, blow molding, or vacuum molding, to give articles such as interior or exterior parts of automobiles such as bumpers, plastic material parts, door trims, instrument panel, trims, console boxes, parts of engine room of automobiles such as batteries and fan shrouds, interior or exterior parts of household electric appliances, interior or exterior parts of house, or articles employable as buffer materials or packing materials.

The reclaimed resin composition of the invention can give molded articles having a glossy surface, embossed articles, articles having color patterns, and articles having a smoothly embossed pattern.

EXAMPLES

The invention is further described below by the following non-limiting examples.

(1) Measurement of Lightness and Hue

Pellets produced by a dual worm extruder were placed in an injection molding machine (clamping pressure: 130 tons, metal mold: square plate (100 mm×100 mm×3 mm, one surface: embossed, another surface: mirror) under the following conditions, to give specimens:

molding the temperature: C1-C2-C3-C4=180° C.-190° C.-200° C.-210° C.
molding pressure: P1-P2-P3-P4=108-98-88-78 (MPa)
molding rate: V1-V2-V3-V4=30-30-20-20 (%)
screw back pressure: free
screw rotation: 60%
mold temperature: 40° C.
cycle: injection: 10 sec., and cooling: 20 sec.
shot conditions: continuous 10 shots, specimen (Specimen A) of 6th to 10th shots were employed for the measurements.

The embossed surface of specimen A is subjected to measurements of "Lightness L*", "Hue a*" and "Hue b*" (CIE 1976), by means of a spectrophotometer (light source: D-65, viewing angle: 10°) available from Kurashiki Spinning Co., Ltd.

(2) Measurement of Light Transmittance

The pellets produced by a dual worm extruder were placed between a pair of ferrotype plates (spacer: 70×50×0.05 mm), and a film (50±3 μm, Specimen B for measurement of total light transmittance) was prepared using a hot press (clamping pressure: 40 tons) under the following conditions: heating temperature: 230° C., heating period: 2 minutes, deforming step: one minute, pressing period (pressure: 100 kg/cm$^2$): one minute, cooling temperature: 20° C., and cooling period: 2 mites.

Specimen B was subjected to measurement of the total light transmittance (%, namely, light-transmittance (%)) using a turbidimeter (NDH 2000, available from Japan Denshoku Co., Ltd.). The light source was a halogen lamp (rated values: 5V-9 W, aperture for light entrance: 20 mmφ). The measurements were made five times on different points on the specimen and processed to give an average value.

(3) Evaluation of Appearance of Embossed Surface of Specimen A

The appearance of the specimen was observed to mark in the following manner:

3: solid foreign materials are noticed (acceptable);
2: some solid foreign materials are noticed;
1: solid foreign materials are clearly noticed.

Examples 1 to 3, Comparison Examples 1 to 3

(1) Waste Plastic Material to be Reclaimed (Collected and Pulverized Resin)

The waste plastic materials to be reclaimed were disused polypropylene household products which were washed and pulverized to sizes of 5 to 16 mm. The pulverized waste plastic materials had mixed colors of colorless, white, and cream-color. The pulverized waste plastic materials were subjected to dry-blending in a blender (available from Platech Co., Ltd.), and melted and kneaded in a dual worm extruder (UME40-48T, available from Ube Industries, Ltd.) under the conditions of a barrel temperature of 220° C. and a process rate of 60 kg/hr., to give pellets of the waste plastic materials. The pellets of the waste plastic materials comprised crystalline polypropylene (MFR: 25 g/10 min.) containing 10.5 wt. % of ethylene-propylene.

The pellets gave a test sheet showing a lightness no of 83.92, a hue a* of −0.50, and a hue b* of 7.98.

Separately, the pulverized waste plastic materials were melted and kneaded for one hour in a dual worm kneader (UME40-48T, available from Ube Industries, Ltd.) equipped with screens of #40/#100/#200/#40 which were set before the breaker plate under the conditions of a barrel temperature of 220° C. and a processing rate of 60 kg/h. Subsequently, the screens were removed from the dual worm kneader, and the product on the screens was placed in a 500 cc volume eggplant type flask. In the flask was then placed 500 cc of p-xylene, and the content was stirred under boiling to give a resin solution. The hot resin solution was filtered with a 5A filter paper using an aspirator-filtering apparatus. The solid foreign materials left on the filter were in an amount of 0.03 wt. %.

Under visual and microscopic observations, it was confirmed that the solid foreign materials were inorganic sand material, plant pieces, resin decomposition product, and pieces of metal and metal oxide in mixture.

(2) Pigments
1) Iron oxide red having a mean diameter of 0.16 μm, a DOP absorption of 23 cc/100 g, and pH 5 to 7
2) Ultramarine blue having a mean diameter of 1 to 3 μm, a DOP absorption of 31 to 33 cc/100 g, and pH 8.5 to 10.5
3) Iron oxide black having a mean diameter of 0.27 μm, a DOP absorption of 26 to 30 cc/100 g, and pH 9 to 10
4) Titanium dioxide having a mean diameter of 0.22 μm, a DOP absorption of 14 cc/100 g, and pH 5.5 to 7.5
5) Titanium yellow having a mean diameter of 0.91 μm, a DOP absorption of 25 cc/100 g, and pH 7.8
6) Carbon black having a mean diameter of 0.017 μm 4 (by furnace method)

(3) Other Additives
1) Dispersant: calcium stearate
2) Oxidation inhibitor: 168

[Production of Reclaimed Resin Composition]

The pulverized waste plastic material to be reclaimed, pigments, a dispersant, and an oxidation inhibitor in a ratio set forth in Table 1 were blended in a blender (available from Platech Co., Ltd) under a dry condition, and melted and kneaded in a dual worm kneader (UME40-48T, available from Ube Industries, Ltd.) under the conditions of a barrel temperature of 220° C. and a processing rate of 60 kg/hr., to obtain pellets of a reclaimed resin composition. The procedure was carried out without a screen.

The pellets of the reclaimed resin composition were processed to prepare a specimen A and a specimen B. The lightness, a*, b* and appearance of the specimen A and the light transmittance of the specimen B is set forth in Table 2.

TABLE 1

|  | Comparison Example | | | Example | | |
| --- | --- | --- | --- | --- | --- | --- |
|  | 1 | 2 | 3 | 1 | 2 | 3 |
| Pulverized resin material | 100 | 100 | 100 | 100 | 100 | 100 |
| Iron oxide red | — | 0.002 | 0.008 | 0.008 | 0.08 | — |
| Ultramarine blue | — | — | 0.25 | — | 0.55 | — |
| Iron oxide black | — | 0.034 | 0.02 | 0.1 | 0.1 | — |
| Titanium dioxide | — | 0.2 | 0.11 | 1.4 | 1.07 | 0.5 |
| Titanium yellow | — | — | — | 0.045 | — | — |
| Carbon black | — | — | — | — | — | 0.1 |
| Calcium stearate | 0.1 | 0.1 | 0.1 | 0.1 | 0.1 | 0.1 |
| IRGAFOS 168 | 0.05 | 0.05 | 0.05 | 0.05 | 0.05 | 0.05 |

Remarks:
unit (weight part(s))

TABLE 2

|  | Comparison Example | | | Example | | |
| --- | --- | --- | --- | --- | --- | --- |
|  | 1 | 2 | 3 | 1 | 2 | 3 |
| Lightness | 83.92 | 69.89 | 59.36 | 70.08 | 59.85 | 38.74 |
| a* | −0.50 | −0.15 | −4.05 | −0.16 | −4.04 | −0.32 |
| b* | 7.98 | 0.90 | −15.45 | 0.77 | −15.68 | −0.76 |
| Transmittance (%) | 81.25 | 75.78 | 70.23 | 54.45 | 46.51 | 49.35 |
| (Lightness × Transmittance) | 6819 | 5296 | 4169 | 3816 | 2784 | 1912 |
| Appearance | 1 | 2 | 2 | 3 | 3 | 3 |
| Hue | cream | gray | blue | gray | blue | gray |

The results in Tables 1 and 2 indicate that the articles (specimens) produced from the reclaimed resin compositions of the invention have excellent appearance.

Example 4 and Comparison Example 4

<Materials Processed.

(1) Waste Plastic Material to be Reclaimed

The waste plastic materials to be reclaimed were ABS resin products (outer interiors, trays) which were pulverized to sizes of 5 to 16 mm. Me pulverized materials had mixed colors of white and light gray. The pulverized materials were subjected to dry-blending in a blender (available from Platech Co., Ltd.), and melted and kneaded in a dual worm extruder under the conditions of a barrel temperature of 220° C. and a processing rate of 60 kg/hr., to give pellets of the reclaimed resin composition.

The ABS resin pellets gave a test sheet showing a lightness L* of 82.7, a hue a* of 0.07, and a hue b* of 3.77.

(2) Pigments
Same as those in Examples 1 to 3

(3) Other Additives
Same as those in Examples 1 to 3

[Production of Reclaimed Resin Composition]

The pulverized waste ABS resin to be reclaimed, pigments, a dispersant, and an oxidation inhibitor in a ratio set forth in able 3 were blended in a blender (available from Platech Co., Ltd) under a dry condition, and melted and kneaded in a dual worm kneader under the conditions of a barrel temperature of 220° C. and a processing rate of 60 kg/hr., to obtain pellets of a reclaimed resin composition. The procedure was carried out without a screen.

The pellets of the reclaimed resin composition were processed to prepare a specimen A and a specimen B. The lightness, a*, b* and appearance of the specimen A and the light transmittance of the specimen B is set forth in Table 3.

TABLE 1

|  | Comparison Example 4 | Example 4 |
| --- | --- | --- |
| Pulverized resin material | 100 | 100 |
| Iron oxide red | — | 0.0027 |
| Iron oxide black | — | 0.0160 |
| Titanium dioxide | — | 2.0 |
| Titanium yellow | — | 0.0060 |
| Calcium stearate | 0.1 | 0.1 |
| IRGAFOS 168 | 0.05 | 0.05 |
| Lightness | 82.7 | 83.38 |
| a* | 0.07 | 0.06 |
| b* | 3.77 | 3.37 |
| Transmittance (%) | 53.72 | 22.58 |
| (Lightness × Transmittance) | 4443 | 1883 |
| Appearance | 1 | 3 |

The results in Table 3 indicate that the articles (specimens) produced from the reclaimed resin compositions of the invention have excellent appearance.

What is claimed is:

1. A process for producing a resin composition satisfying the below-mentioned condition 2 which comprises the steps of mixing a pulverized waste plastic material containing a major portion of a thermoplastic resin and 0.001 to 2 weight % of a non-thermoplastic solid foreign material and satisfying the below-mentioned condition 1 with light-shielding components comprising a white pigment, a colored pigment, a black pigment or combination thereof to give a mixture, and melting the mixture under heating, condition 1: a sheet made from the pulverized waste plastic material shows a relationship between a lightness and a light transmittance satisfying the following condition:

$$(C \times D) > 4000$$

wherein C means a lightness of a sheet of 3 mm thick having been made of the pulverized waste plastic material, and D means a total light transmittance in terms of % of a sheet of 50 μm thick having been made of the pulverized waste plastic material, condition 2: a sheet made from the resin composition shows a lightness in the range of 30 to 90, a light transmittance in the range of 15 to 70%, and a relationship between the lightness and light transmittance satisfying the following condition:

$$1300 \leq (A \times B) \leq 4000$$

wherein A means a lightness of a sheet of 3 mm thick having been made of the resin composition, and B means a total light transmittance in terms of % of a sheet of 50 μm thick having been made of the resin composition.

2. The process of claim 1, in which the light-shielding component comprises titanium dioxide and a colored pigment.

3. The process of claim 1, in which the light-shielding component comprises titanium dioxide and carbon black.

4. The process of claim 1, in which the pulverized waste plastic material contains a thermoplastic material selected from the group consisting of polyolefin, polyester, polystyrene, ABS resin, and polyamide.

5. The process of claim 1, in which the colored pigment is titanium yellow.

6. The process of claim 1, in which the black pigment is iron black.

* * * * *

UNITED STATES PATENT AND TRADEMARK OFFICE
CERTIFICATE OF CORRECTION

PATENT NO. : 7,619,013 B2
APPLICATION NO. : 10/576199
DATED : November 17, 2009
INVENTOR(S) : Ako et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 512 days.

Signed and Sealed this

Fourteenth Day of December, 2010

David J. Kappos
*Director of the United States Patent and Trademark Office*